United States Patent
Richards et al.

(10) Patent No.: US 6,879,827 B2
(45) Date of Patent: Apr. 12, 2005

(54) TESTING A COMMUNICATION NETWORK WITH A SHARED TEST PORT

(75) Inventors: Douglas L. Richards, Stilwell, KS (US); Gregory A. Wolfe, Spring Hill, KS (US); Kevin H. Hansen, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 259 days.

(21) Appl. No.: 10/345,768

(22) Filed: Jan. 16, 2003

(65) Prior Publication Data

US 2004/0142687 A1 Jul. 22, 2004

(51) Int. Cl.[7] ............................. H04Q 7/20; H04B 17/00
(52) U.S. Cl. ..................... 455/423; 455/424; 455/67.14; 379/9; 379/15.01; 379/22.01; 379/27.03; 370/241; 370/249
(58) Field of Search .................................. 455/423, 424, 455/67.11, 67.13, 67.14, 67.15; 379/4.01, 9, 9.04, 10.01, 10.02, 15.01, 22.01, 27.03, 29.01; 370/241, 249

(56) References Cited

U.S. PATENT DOCUMENTS

| | | | | |
|---|---|---|---|---|
| 5,001,568 A | * | 3/1991 | Efron et al. ................ 386/46 |
| 5,070,536 A | * | 12/1991 | Mahany et al. .......... 455/67.14 |
| 5,712,897 A | * | 1/1998 | Ortel ........................... 379/22 |
| 5,796,953 A | | 8/1998 | Zey |
| 5,854,823 A | | 12/1998 | Badger et al. |
| 6,154,523 A | * | 11/2000 | Hofmann et al. ............. 379/22 |
| 6,466,647 B1 | * | 10/2002 | Tennyson .................. 379/1.04 |
| 2002/0016708 A1 | | 2/2002 | Houth |

FOREIGN PATENT DOCUMENTS

WO    WO 94/13073    6/1994

* cited by examiner

*Primary Examiner*—Binh Tieu

(57) ABSTRACT

A system for testing a communication network includes a test system and a cross-connect system. The test system generates a plurality of independent low data rate test signals with first data rates. The test system combines the independent low data rate test signals to generate a high data rate test signal. The test system then transmits the high data rate test signal from the test system to a shared test port. The cross-connect system transfers the high data rate test signal to a cross-connect matrix that connects the independent low data rate test signals to the communication network. The cross-connect system then receives the independent low data rate test signals from the communication network into the shared test port. The cross-connect system transmits the high data rate test signal from the shared test port to the test system. The test system separates the high data rate test signal into the independent low data rate test signals. The test system then independently tests the independent low data rate test signals as separate test sessions.

34 Claims, 6 Drawing Sheets

TESTING A COMMUNICATION NETWORK WITH A SHARED TEST PORT

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of telecommunications, and in particular, to systems and methods that test a communication network with a shared test port.

2. Description of the Prior Art

Testing a communication network for monitoring, maintenance, and trouble shooting is an essential operation to ensure that the communication network is running optimally with minimal problems. In some examples, network operators use specialized test equipment to conduct bit error rate (BER) testing or analyze signals in the communication network. Minimizing the cost of these specialized test equipment reduces the overall costs of operating the communication network.

FIG. 1 depicts an illustration of a communication network 100 in the prior art. FIG. 1 depicts a prior solution for testing the communication network 100 using test analyzers 130 and 140, a broadband digital cross-connect system (DCS) 120, and a BER test system 150. The test analyzers 130 and 140 perform fine granular testing for single sessions using Optical Carrier (OC)-12 and OC-3 test signals through the test port 122 and 124, respectively. One example of these test analyzers 130 and 140 is the OmniBER from Agilent Technologies. The BER test system 150 is a rack system that includes a central processing unit 152, a clock 154, and plug-in cards for transmitters 156 and 162 and receivers 158 and 164. The transmitters 156 and 162 transmit BER test signals to the test ports 126 and 128 in the broadband DCS 120, respectively. The BER test signals then propagate through the OC-48/STM-16 transmission system 110 and 130. The receivers 158 and 164 then receive the BER test signals from the test port 126 and 128, respectively. The BER test system 150 then performs BER testing. The test sets are remotely controlled from a network operations center (NOC) as is the DCS test port 122, 124, 126, and 128 and the internal cross-connection of the individual channels (e.g. STS-n).

The test ports in the broadband DCS 120 are rate specific and are each connected to a single dedicated test head having transmit and receive capability. Each test port in the broadband DCS 120 supports only one specific test as shown in FIG. 1. One problem with this prior system is the testing consumes a number of test ports in the broadband DCS 120. Also, another problem is separate test equipment is required for each test. Unfortunately, these problems increase costs of testing a communication network. Another problem is the test signal in this prior system does not provide a realistic mixture of test signals. A network operator may not drill down and conduct independent tests on STS-n signals contained in the test port. In one example, a DS3 mapping is only available as an OC-48 (DS-3) meaning all 48 STS-1s map a DS3 into the payload envelope. The user can not declare an STS-3c within the same OC-48 along with the DS3's. In one example, a technician may not be able to turn-up a DS3 and two STS-3cs because full multitasking is not available through one test port.

SUMMARY OF THE INVENTION

The inventions solve the above problems by testing a communication network using a shared test port in a cross-connect system. A system for testing a communication network includes a test system and a cross-connect system. The test system generates a plurality of independent low data rate test signals with first data rates. The test system combines the independent low data rate test signals to generate a high data rate test signal wherein a second data rate of the high data rate test signal is higher than any of the first data rates of the independent low data rate test signals. The test system then transmits the high data rate test signal from the test system to a shared test port in a cross-connect system. The cross-connect system transfers the high data rate test signal from the shared test port to a cross-connect matrix that connects the independent low data rate test signals to the communication network. The cross-connect system then receives the independent low data rate test signals from the communication network into the shared test port through the cross-connect matrix. The cross-connect system transmits the high data rate test signal that includes the independent low data rate test signals from the shared test port to the test system. The test system separates the high data rate test signal into the independent low data rate test signals. The test system then independently tests the independent low data rate test signals as separate test sessions.

In some embodiments, the test system performs bit error rate testing on the independent low data rate test signals. In some embodiments, the test system resets a counter for one of the independent low data rate test signals. In some embodiments, the test system performs finer granular testing on the independent low data rate test signals. In some embodiments, the high data rate test signal and the independent low data rate test signals comprise Optical Carrier-n signals. In some embodiments, the high data rate test signal and the independent low data rate test signals comprise Digital Signal-n signals. In some embodiments, the high data rate test signal and the independent low data rate test signals comprise Synchronous Transport Signal-n signals. In some embodiments, the high data rate test signal and the independent low data rate test signals comprise Synchronous Transport Module-n signals.

The invention advantageously reduces the number of test ports in the cross-connect system. Also, the test system can also handle multiple independent test sessions with the plurality of the independent low data rate test signals, which eliminates the cost of additional test equipment. Thus, the reduced cost associated with the testing of the communication network reduces the overall costs of operating the communication network. Also, the plurality of the independent low data rate test signals through one shared test port allows a user to specify a mixture of test signals in one shared test port.

BRIEF DESCRIPTION OF THE DRAWINGS

The same reference number represents the same element on all drawings.

DETAILED DESCRIPTION OF THE INVENTION

FIGS. 2–6B and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
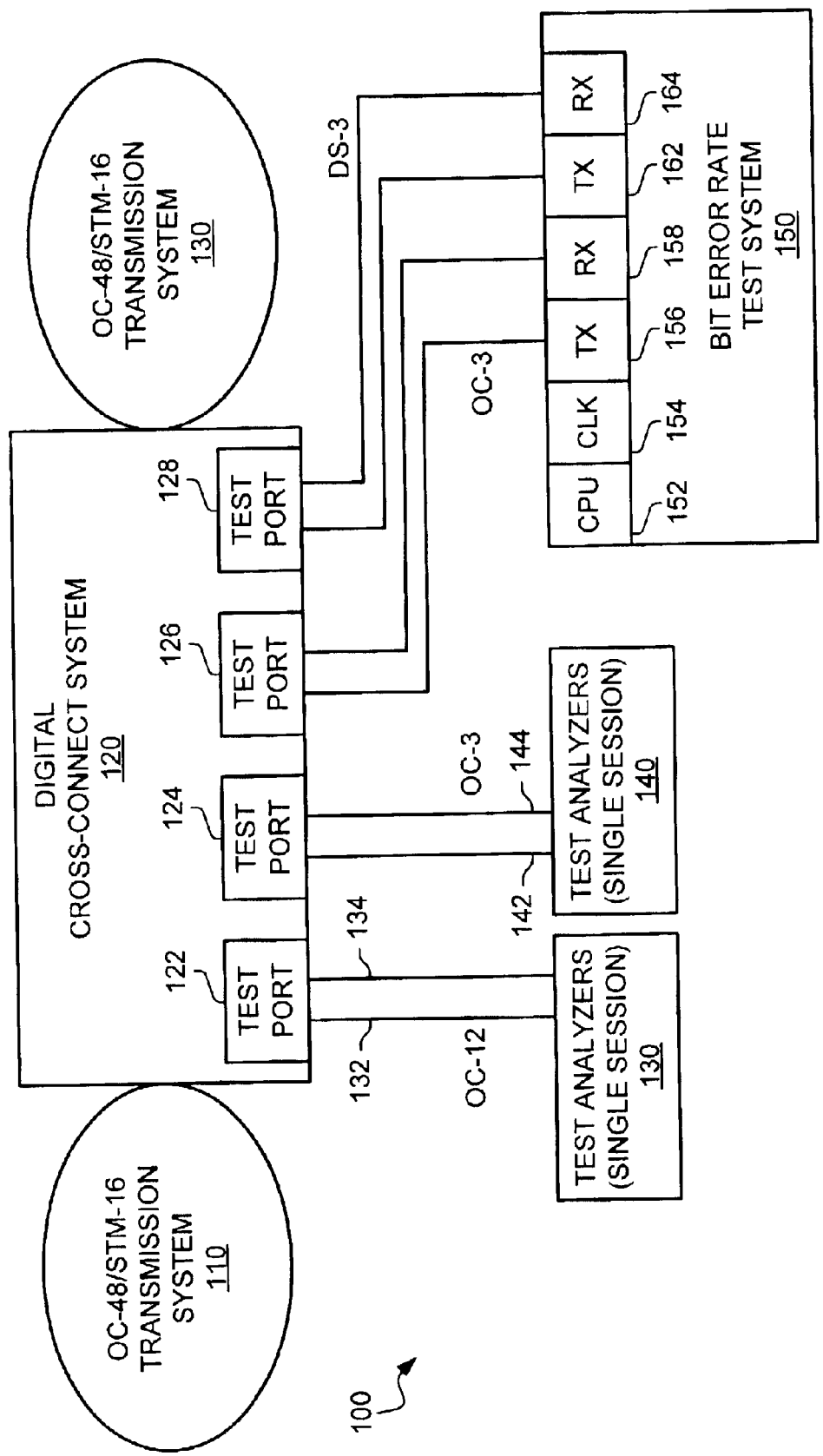
FIG. 1 is an illustration of a communication network in the prior art.
Figure 2:
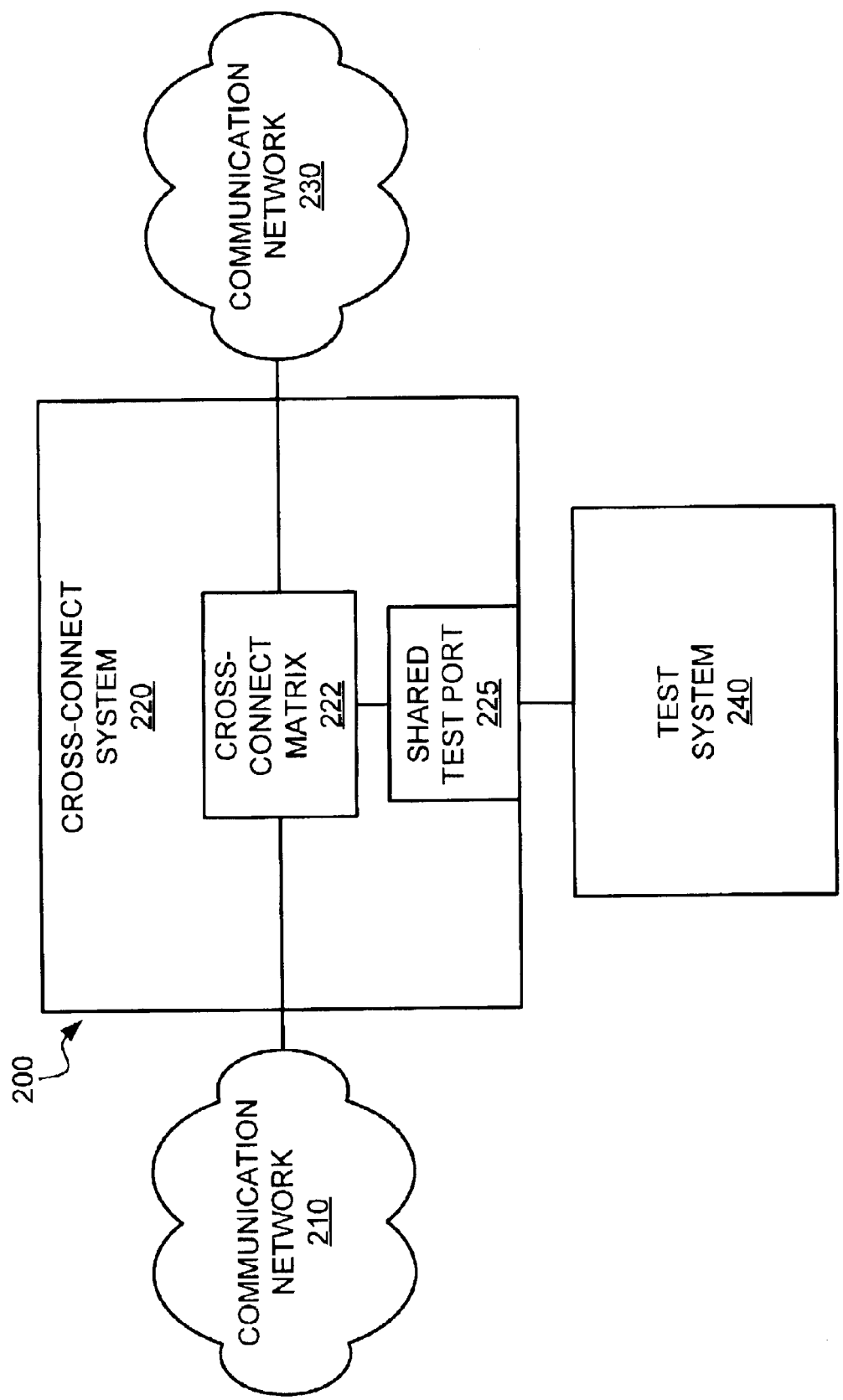
FIG. 2 is an illustration of a network in an example of the invention.
Figure 3:
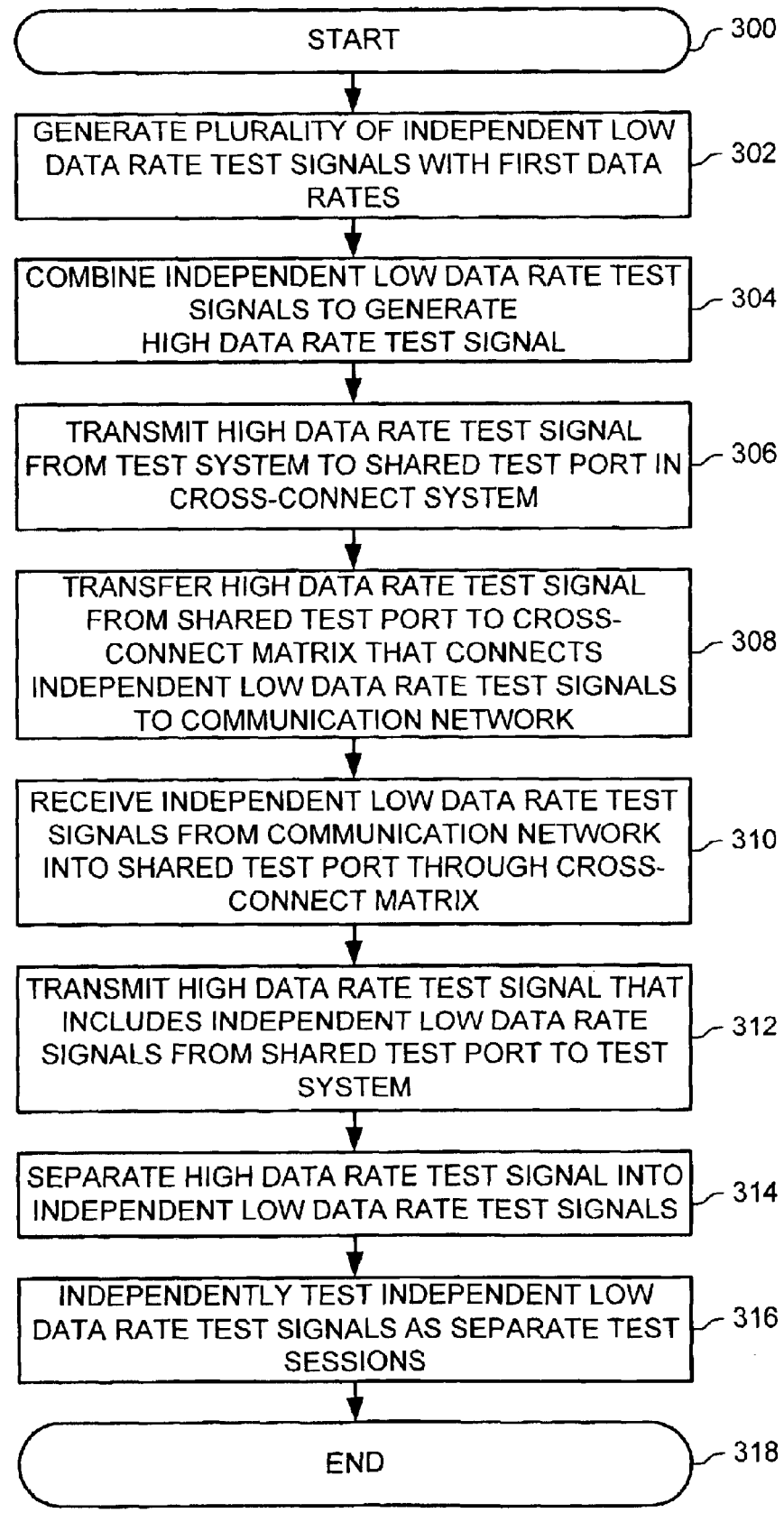
FIG. 3 is a flow chart for the operation of the network in an example of the invention.
Figure 4:
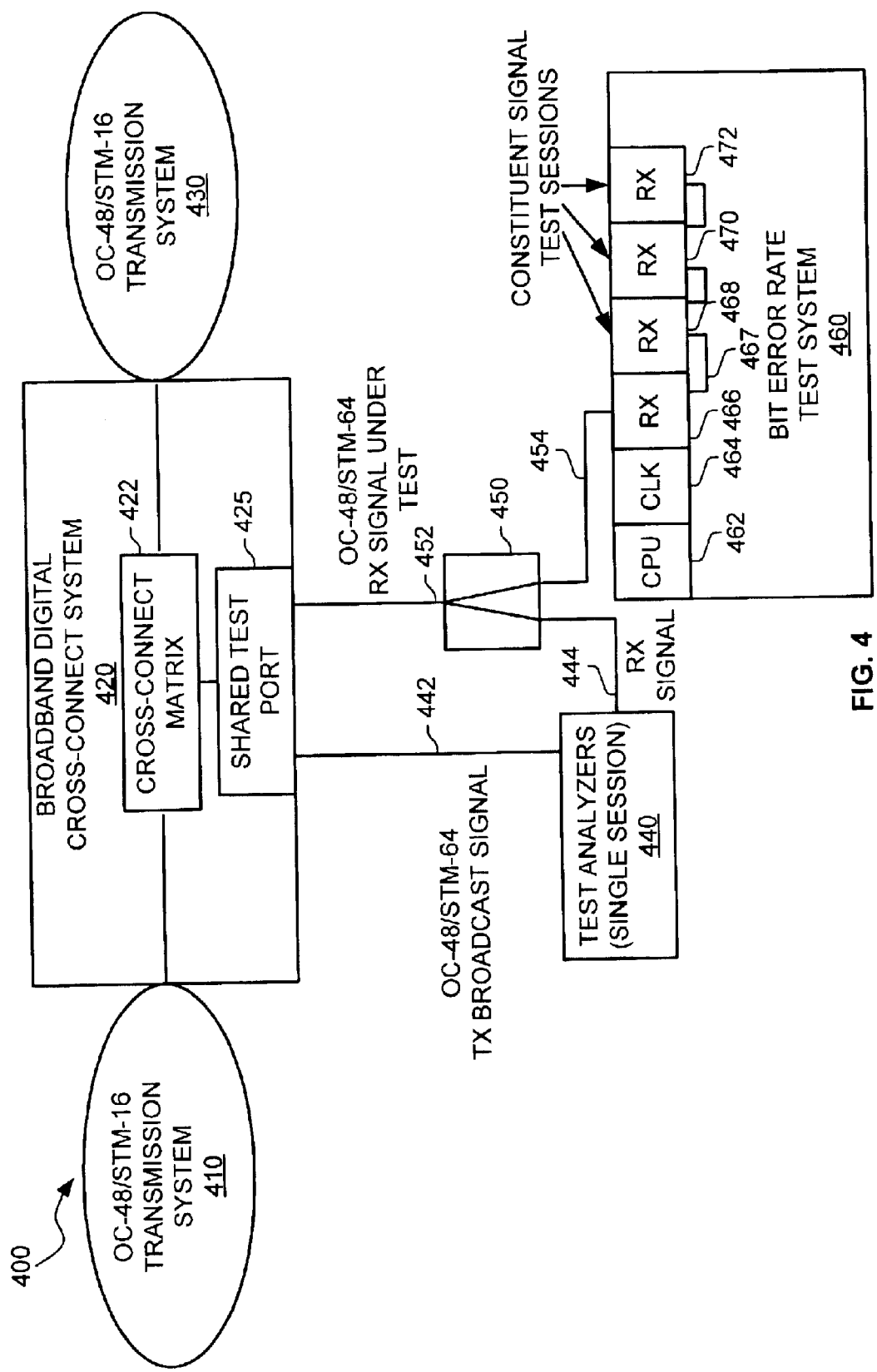
FIG. 4 is an illustration of a network with a test analyzer and a bit error rate (BER) test system in an example of the invention.

Testing a Communication Network—FIGS. 2–3

FIG. 2 depicts an illustration of a network 200 in an example of the invention. The network 200 includes a communication network 210, a cross-connect system 220, a communication network 230, and a test system 240. The cross-connect system 220 includes a cross-connect matrix 222 and a shared test port 225. The cross-connect matrix 222 is connected to the communication network 210, the communication network 230, and the shared test port 225. The shared test port 225 is connected to the test system 240.

The communication network 210 and the communication network 230 are any network of communication devices configured to carry communication signals. In one example, the communication network 210 and the communication network 230 are OC-48/STM-16 transmission systems.

The test system 240 is any system, device, or group of devices configured to (1) generate a plurality of independent low data rate test signals with first data rates, (2) combine the independent low data rate test signals to generate a high data rate test signal wherein a second data rate of the high data rate test signal is higher than any of the first data rates of the independent low data rate test signals, (3) transmit the high data rate test signal to the shared test port 225 in the cross-connect system 220, (4) separate the high data rate test signal into the independent low data rate test signals, and (5) independently test the plurality of the independent low data rate test signals as separate test sessions.

A test signal is any signal that is generated to test, monitor, or manage a communication network. The test signal has a data rate that indicates the quantity of data transmitted. A high data rate test signal has a data rate that is higher than a data rate of a low data rate test signal. In one example, an OC-48 test signal has a higher data rate than a OC-12 test signal.

The cross-connect system 220 is any cross-connect system or cross-connect device configured to (1) transfer the high data rate test signal from the shared test port 225 to a cross-connect matrix 222 that connects the independent low data rate test signals to the communication network 210, (2) receive the independent low data rate test signals from the communication network 210 into the shared test port 225 through the cross-connect matrix 222, and (3) transmit the high data rate test signal that includes the independent low data rate signals from the shared test port 225 to the test system 240. One example of the cross-connect system 220 is a broadband digital cross-connect system, which is further described below.

FIG. 3 depicts a flow chart for the operation of the network 200 in an example of the invention. FIG. 3 begins in step 300. In step 302, the test system 240 generates a plurality of low data rate test signals with first data rates. In step 304, the test system 240 combines the independent low data rate test signals to generate a high data rate test signal wherein a second data rate of the high data rate test signal is higher than any of the first data rates of the independent low data rate test signals. In step 306, the test system 240 transmits the high data rate test signal to a shared test port 225 in a cross-connect system 240.

In step 308, the cross-connect system 220 transfers the high data rate test signal from the shared test port 225 to a cross-connect matrix 222 that connects the independent low data rate test signals to the communication network 210. In step 310, the cross-connect system 220 receives the independent low data rate test signals from the communication network 210 into the shared test port 225 through the cross-connect matrix 222. In step 312, the cross-connect system 220 transmits the high data rate test signal that includes the independent low data rate signals from the shared test port 225 to the test system 240. In step 314, the test system 240 separates the high data rate test signal into the independent low data rate test signals. In step 316, the test system 240 independently tests the independent low data rate test signals as separate test sessions. FIG. 3 ends in step 318.

The invention advantageously reduces the number of test ports in the cross-connect system 220. Also, the test system 240 can also handle multiple test sessions with the plurality of the low data rate test signals, which eliminates the cost of additional test equipment. Thus, the reduced cost associated with the testing the communication network reduces the overall costs of operating the communication network. Also, the plurality of the low data rate test signals through one shared test port 225 allows a user to specify a mixture of independent test signals in one shared test port 225. For example, one shared test port that handles OC-48 can support three STS-1 (DS-3) services, three STS-3c and three STS-12c services, and the low data rate signals may be configured individually without interfering with other test sessions in progress. Results from each independent low data rate test session are collected and are capable of being selected for display without disrupting on going test sessions.

Testing a Communication Network with a Broadband Digital Cross-Connect System—FIGS. 4–6B FIG. 4 depicts an illustration of a network 400 with a test analyzer 440 for a complex and infrequent session testing and a simplified bit error rate (BER) test system 460 for more frequent testing needs in an example of the invention. The network 400 includes an OC-48/STM-16 transmission system 410, a broadband digital cross-connect system (DCS) 420, an OC-48/STM-16 transmission system 430, a test analyzer 440, a splitter 450, and a bit error rate (BER) test system 460. The broadband DCS 420 includes a cross-connect matrix 422 and a shared test port 425. The BER test system 460 includes a central processing unit (CPU) 462, a clock (CLK) 464, a receiver (RX) 466, a receiver 468, a receiver 470, and a receiver 472.

The OC-48/STM-16 transmission system 410 is connected to the cross-connect matrix 422 in the broadband DCS 420. The cross-connect matrix 422 in the broadband DCS 420 is connected to the OC-48/STM-16 transmission system 430. The cross-connect matrix 422 is also connected to the shared test port 425. The shared test port 425 in the broadband DCS 420 is connected to the test analyzer 440 and the splitter 450 via the link 442 and the link 452, respectively. The splitter 450 is connected to the test analyzer 440 via the link 444. The splitter 450 is also connected to the receiver 466 via the link 454. The receiver 466, the receiver 468, the receiver 470, and the receiver 472 are all interconnected via an internal bus 467.

The test drive transmitter output of the test analyzer 440 is cross-connected to the shared test port 422 of the broadband DCS 420. The shared test port 422 is a high speed test port that handles an OC-48/STM-64 in one example. The test analyzer 440 generates a plurality of independent low data rate test signals with first data rates. In this example, the independent low data rate test signals are STS-3c channels, where identical test signals are broadcast on the individual TDM channels. In the parlance of test equipment, "background" channels are said to match the "foreground channel." The test analyzer 440 then combines the independent low data rate test signals to generate a high data rate test signal. In this example, this high data rate test signal is remotely configured as a channelized SONET/SDH signal. In this example, the high data rate test signal is an OC-48 signal. In this example, sixteen individual STS-3c or STM-1 signals are now available as signal sources for BER test sessions. In another example four STS-12c signal sources can be generated for BER testing using a OC-48 shared test port. The test analyzer 440 then transmits the high data rate test signal to the shared test port 422 in the broadband DCS 420, which cross-connects those test sources to the communication network to be tested. In this example, the transmitter plug-in card in the rack BER test system 460 can be advantageously eliminated because the test analyzer 440 is used as a source for transmit signals.

The broadband DCS 420 transfers the high data rate test signal from the shared test port 425 to a cross-connect matrix 422 that connects the independent low data rate test signal to the OC-48/STM-16 transmission system 430. In some embodiments, the broadband DCS 420 is remotely commanded to map individual test set channel (e.g. STS-3cs in the example with the OC-48 shared test port) to the outgoing circuit under test. In some embodiments, at a far-end client-side interface, the broadband DCS 420 is commanded to erect a soft facility loop back. This loop back is used as a signal source for the opposite direction of transmission in the transmission system 430. The broadband DCS 420 receives the low data rate test signals from OC-48/STM-16 transmission system 430 into the shared test port 425 through the cross-connect matrix 422.

The broadband DCS 420 transmits the high data rate test signal that includes the low data rate test signals from the shared test port 425 to the splitter 450. The splitter 450 is a 1:2 splitter (−3 dB loss). The splitter 450 allows the test analyzer 440 and the BER test system 460 to test or monitor the high data rate test signal from the shared test port 425.

The test analyzer 440 then receives the high data rate test signal from the splitter 450 and separates the high data rate test signal into the independent low data rate test signals.

The test analyzer 440 provides finer granular testing and solves more formidable problems. One example of the test analyzer 440 is the OmniBER from Agilent Technologies. With the test analyzer 440, a user selects a particular channel for testing and starts the test. In one example, the test analyzer 440 detects the occurrence of errors and alarms on background channels, but the test analyzer 440 does not count or display these errors and alarms. In an example of a single session test analyzer 440, if a user turns to another channel of interest, the test on the current channel is disrupted. An embodiment for a multi-session test analyzer is described below.

The BER test system 460 also receives the high data rate test signal from the splitter 450 and separates the high data rate test signal into the independent low data rate test signals. Individual channels may be selected for testing by the individual receivers 466, 468, 470, and 472. The BER test system 460 is a rack system with a CPU 462 and a clock 464. The BER test system 460 accommodates various plug-in receiver cards. In this embodiment, the receivers 466, 468, 470, and 472 are adjacent OC-3/12 cards across the back-plane of the BER test system 460. In some embodiments, multiple users remotely control individual tests on the BER test system 460. The rack system of the BER test system 460 permits a limited test capability and is used primarily for basic physical layer 1 (Open System Interconnection model) testing. The BER test system 460 can select a particular STS-3/3c to monitor as can other OC-3/OC-12 cards. Advantageously, the number of test ports and transmitters are reduced while still permitting STS-3/12, DS3, E1, or DS1 circuits to be simultaneously tested. In this embodiment, the elements within the network 400 are remotely controlled by a network operations center (NOC). In other embodiments, the elements within the network 400 may be remotely controlled by a management system.

Figure 5:
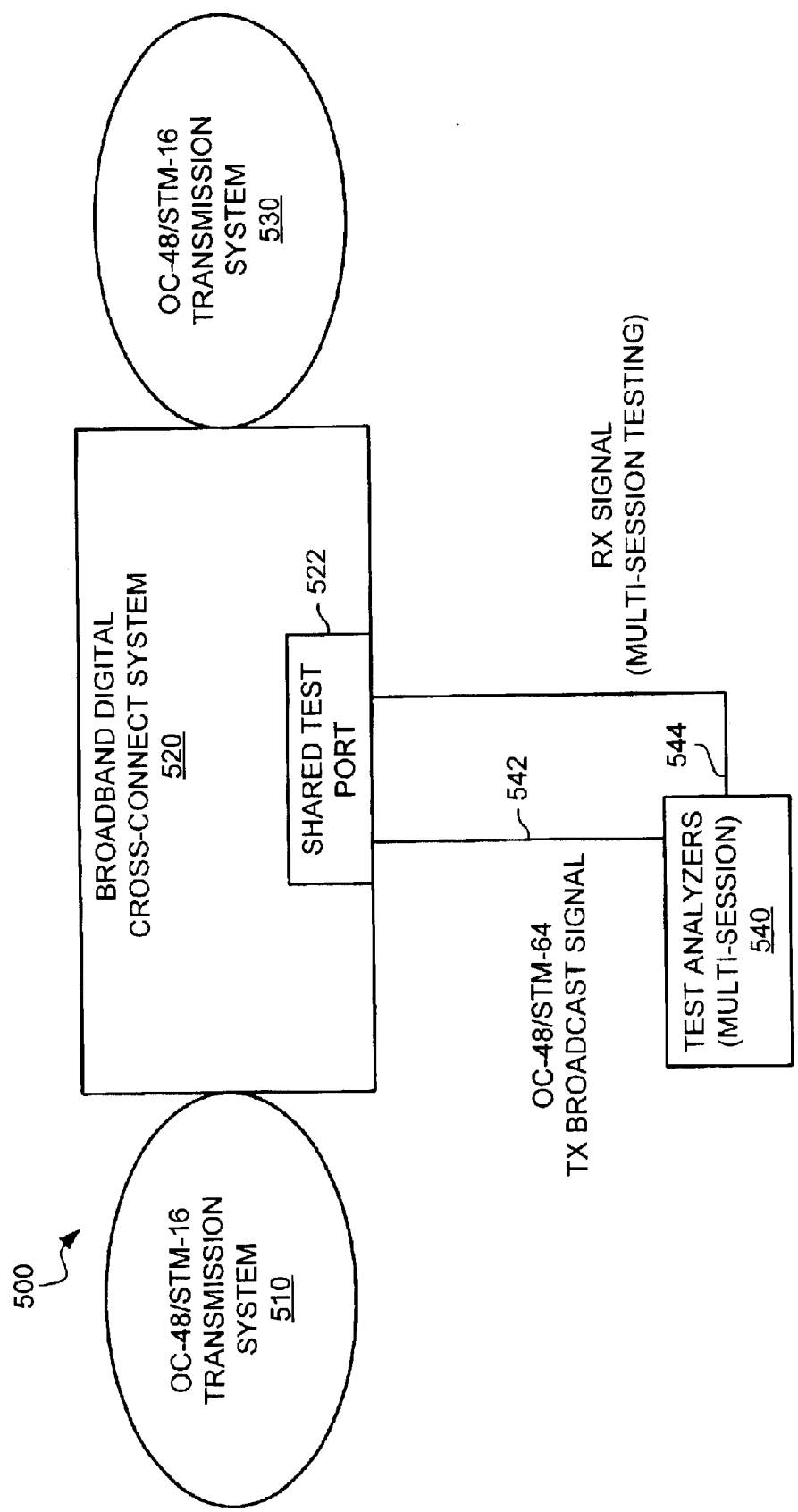
FIG. 5 is an illustration of a network with a test analyzer for multi-session in an example of the invention.

In another embodiment, a single test analyzer is user for multi-session testing. FIG. 5 depicts an illustration of a network 500 with a test analyzer 440 for multi-session in an example of the invention. The network 500 includes an OC-48/STM-16 transmission system 510, a broadband digital cross-connect system (DCS) 520, an OC-48/STM-16 transmission system 530, and a test analyzer 540. The broadband DCS 520 includes a shared test port 522.

The OC-48/STM-16 transmission system 510 is connected to the broadband DCS 520. The broadband DCS 520 is connected to the OC-48/STM-16 transmission system 530. The shared test port 522 of the broadband DCS 520 is connected to the test analyzer 540 via the link 542 and the link 544. The link 542 carries the OC-48/STM-64 transmit test signal. The link 544 carries the OC-48/STM-64 receive test signal. In this embodiment, the test analyzer 540 performs the finer granular testing and BER testing as discussed in FIG. 4 within one system. This embodiment advantageously eliminates the splitter and the rack system of the BER test system at many nodes without losing the functionality of the BER test system. Sometimes errors are required to be counted independently on background channels and the user may wish to change to another channel for monitoring without disrupting the test on the previous channel. Also, this embodiment can zero counters or registers on selected channels without disturbing counters on other channels. This may be helpful for problem with a circuit under test being corrected and the desire to restart a turn-up BER test without disrupting other ongoing tests.

Figure 6B:
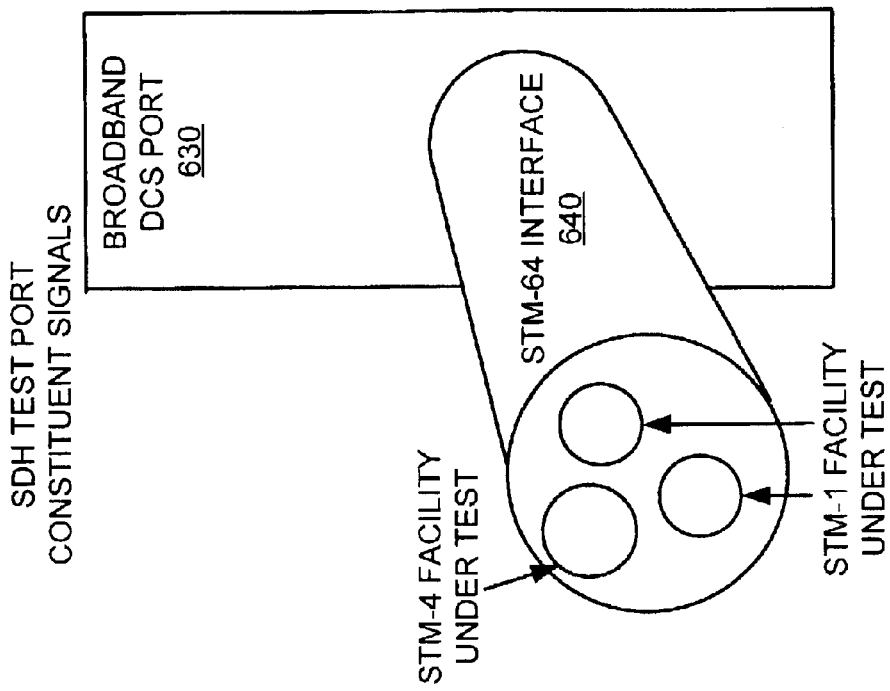
FIG. 6B is an illustration of a broadband DCS port and a STM-64 interface in an example of the invention.
Figure 6A:
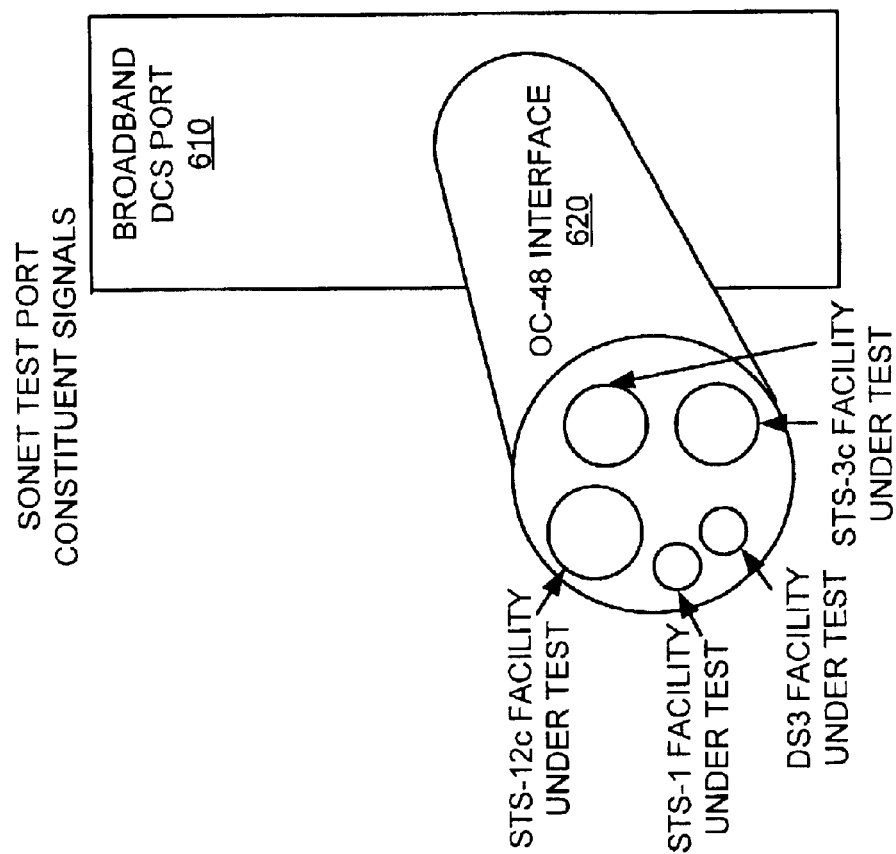
FIG. 6A is an illustration of a broadband DCS port and an OC-48 interface in an example of the invention.

FIG. 6A depicts a broadband DCS port 610 and OC-48 interface 620 in an example of the invention. FIG. 6A depicts an example of a SONET test port constituent (low rate) signals. The broadband DCS port 610 is connected to the OC-48 interface 620. The OC-48 interface 620 includes a STS-12c facility under test, a STS-1 facility under test, a DS3 facility under test, and a STS-3c facility under test.

FIG. 6B depicts a broadband DCS port 630 and STM-64 interface 640 in an example of the invention. FIG. 6B depicts an example of a SDH test port constituent (low rate) signals. The broadband DCS port 630 is connected to the STM-64 interface 640. The STM-64 interface 640 includes a STM-4 facility under test, a STM-1 facility under test, and a STM-1 facility under test.

The above embodiments describe test examples for basic physical layer 1 (Open System Interconnection model) testing. Other embodiments additionally use testing for layers 2–7 of the Open System Interconnection model by using simple drop and insert test ports on the test analyzer shown in FIG. 4. In these embodiments, a desired layered multi-user, multi-session test capability is achieved. These embodiments may be simpler to manage and more cost effective, which permits the network provider to purchase best-in-breed, e.g. layer 1 test set, and utilize much of its investment in other layer 2–7 test sets (to include training). The user focusing on layer 1 transport relies simply on this new test analyzer with a look and feel that is familiar. Many DCS ports previously consumed for testing purposes are freed for reassignment.

What is claimed is:

1. A method of testing a communication network, the method comprising:

in a test system, generating a plurality of independent low data rate test signals with first data rates;

in the test system, combining the independent low data rate test signals to generate a high data rate test signal wherein a second data rate of the high data rate test signal is higher than any of the first data rates of the independent low data rate test signals;

transmitting the high data rate test signal from the test system to a shared test port in a cross-connect system;

in the cross-connect system, transferring the high data rate test signal from the shared test port to a cross-connect matrix that connects the independent low data rate test signals to the communication network;

receiving the independent low data rate test signals from the communication network into the shared test port through the cross-connect matrix;

transmitting the high data rate test signal that includes the independent low data rate signals from the shared test port to the test system;

in the test system, separating the high data rate test signal into the independent low data rate test signals; and in the test system, independently testing the independent low data rate test signals as separate test sessions.

2. The method of claim 1 wherein testing the independent low data rate test signals comprises performing bit error rate testing on the independent low data rate test signals.

3. The method of claim 2 wherein performing bit error rate testing on the independent low data rate test signals comprises resetting a counter for one of the independent low data rate test signals.

4. The method of claim 1 wherein testing the independent low data rate test signals comprises performing finer granular testing on the independent low data rate test signals.

5. The method of claim 1 further comprising in the test system, splitting the high data rate test signal from the shared test port.

6. The method of claim 1 wherein the high data rate test signal comprises an Optical Carrier-n signal.

7. The method of claim 1 wherein the high data rate test signal comprises a Digital Signal-n signal.

8. The method of claim 1 wherein the high data rate test signal comprises a Synchronous Transport Signal-n signal.

9. The method of claim 1 wherein the high data rate test signal comprises a Synchronous Transport Module-n signal.

10. The method of claim 1 wherein the independent low data rate test signals comprises Optical Carrier-n signals.

11. The method of claim 1 wherein the independent low data rate test signals comprises Digital Signal-n signals.

12. The method of claim 1 wherein the independent low data rate test signals comprises Synchronous Transport Signal-n signals.

13. The method of claim 1 wherein the independent low data rate test signals comprises Synchronous Transport Module-n signals.

14. The method of claim 1 wherein the cross-connect system comprises a broadband digital cross-connect system.

15. The method of claim 1 further comprising in a management system, remotely controlling the test system.

16. The method of claim 1 further comprising in a management system, remotely controlling the cross-connect system.

17. The method of claim 1 further comprising in a management system, remotely controlling the communication network.

18. A system for testing a communication network, the system comprising:

a test system configured to generate a plurality of independent low data rate test signals with first data rates, combine the independent low data rate test signals to generate a high data rate test signal wherein a second data rate of the high data rate test signal is higher than any of the first data rates of the independent low data rate test signals, transmit the high data rate test signal to a shared test port in a cross-connect system, separate the high data rate test signal into the independent low data rate test signals, and independently test the independent low data rate test signals as separate test sessions; and the cross-connect system configured to transfer the high data rate test signal from the shared test port to a cross-connect matrix that connects the independent low data rate test signals to the communication network, receive the independent low data rate test signals from the communication network into the shared test port through the cross-connect matrix, and transmit the high data rate test signal that includes the independent low data rate signals from the shared test port to the test system.

19. The system of claim 18 wherein the test system is configured to perform bit error rate testing on the independent low data rate test signals.

20. The system of claim 19 wherein the test system is configured to reset a counter for one of the independent low data rate test signals.

21. The system of claim 18 wherein the test system is configured to perform finer granular testing on the independent low data rate test signals.

22. The system of claim 18 wherein the test system is configured to split the high data rate test signal.

23. The system of claim 18 wherein the high data rate test signal comprises an Optical Carrier-n signal.

24. The system of claim 18 wherein the high data rate test signal comprises a Digital Signal-n signal.

25. The system of claim 18 wherein the high data rate test signal comprises a Synchronous Transport Signal-n signal.

26. The system of claim 18 wherein the high data rate test signal comprises a Synchronous Transport Module-n signal.

27. The system of claim 18 wherein the independent low data rate test signals comprises Optical Carrier-n signals.

28. The system of claim 18 wherein the independent low data rate test signals comprises Digital Signal-n signals.

29. The system of claim 18 wherein the independent low data rate test signals comprises Synchronous Transport Signal-n signals.

30. The system of claim 18 wherein the independent low data rate test signals comprises Synchronous Transport Module-n signals.

31. The system of claim 18 wherein the cross-connect system comprises a broadband digital cross-connect system.

32. The system of claim 18 further comprising a management system configured to remotely control the test system.

33. The system of claim 18 further comprising a management system configured to remotely control the cross-connect system.

34. The system of claim 18 further comprising a management system configured to remotely control the communication network.

\* \* \* \* \*